(12) United States Patent
Zimmermann

(10) Patent No.: US 8,066,868 B1
(45) Date of Patent: Nov. 29, 2011

(54) FLUID CATALYTIC CRACKING TO PRODUCE AND RECOVER LIGHT OLEFINS

(75) Inventor: Joseph E. Zimmermann, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 888 days.

(21) Appl. No.: 11/642,455

(22) Filed: Dec. 20, 2006

(51) Int. Cl.
*C10G 11/18* (2006.01)

(52) U.S. Cl. ........ 208/113; 208/100; 208/101; 208/102; 208/103; 208/104

(58) Field of Classification Search .............. 208/46, 208/95, 100–104, 106, 113–124
See application file for complete search history.

(56) References Cited

U.S. PATENT DOCUMENTS

| | | | | |
|---|---|---|---|---|
| 2,813,920 A | * | 11/1957 | Cobb, Jr. | 208/101 |
| 2,857,018 A | * | 10/1958 | Partridge et al. | 95/174 |
| 3,416,324 A | * | 12/1968 | Swearingen | 62/619 |
| 3,537,978 A | * | 11/1970 | Borst, Jr. | 208/101 |
| 3,702,886 A | | 11/1972 | Argauer et al. | |
| 4,072,023 A | * | 2/1978 | Springmann | 62/650 |
| 4,072,604 A | * | 2/1978 | Ward | 208/101 |
| 4,479,812 A | | 10/1984 | Hsia et al. | |
| 4,525,180 A | | 6/1985 | Hirai et al. | |
| 5,245,099 A | | 9/1993 | Mitariten | |
| 5,360,533 A | | 11/1994 | Tagamolila et al. | |
| 5,520,724 A | | 5/1996 | Bauer et al. | |
| 5,546,764 A | | 8/1996 | Mehra | |
| 5,584,985 A | | 12/1996 | Lomas | |
| 5,799,031 A | * | 8/1998 | Marie et al. | 372/59 |
| 5,858,206 A | | 1/1999 | Castillo | |
| 6,266,977 B1 | | 7/2001 | Howard et al. | |
| 6,271,433 B1 | | 8/2001 | Keady et al. | |
| 6,308,532 B1 | | 10/2001 | Hopewell | |
| 6,538,169 B1 | * | 3/2003 | Pittman et al. | 208/114 |
| 6,843,906 B1 | | 1/2005 | Eng | |
| 7,178,351 B2 | * | 2/2007 | Varney | 62/178 |

* cited by examiner

*Primary Examiner* — Glenn Caldarola
*Assistant Examiner* — Randy Boyer
(74) *Attorney, Agent, or Firm* — James C Paschall

(57) ABSTRACT

Processing schemes and arrangements are provided for the processing a heavy hydrocarbon feedstock via fluidized catalytic cracking with selected hydrocarbon fractions including light olefins being obtained via absorption and separation product recovery.

20 Claims, 2 Drawing Sheets

FLUID CATALYTIC CRACKING TO PRODUCE AND RECOVER LIGHT OLEFINS

BACKGROUND OF THE INVENTION

This invention relates generally to hydrocarbon processing and, more particularly, to the processing of hydrocarbon-containing materials having a high light olefin content, such as produced or formed in or by the cracking of a heavy hydrocarbon feedstock.

Light olefins serve as feed materials for the production of numerous chemicals. Light olefins have traditionally been produced through the processes of steam or catalytic cracking of hydrocarbons such as derived from petroleum sources. Production and recovery of light olefins from refinery streams and processes is becoming increasingly more attractive as the supply of natural gas liquids (NGLs) and other steam cracker feedstock becomes limited or more expensive. Fluidized catalytic cracking (FCC) of heavy hydrocarbon streams is commonly carried out by contacting a starting material whether it be vacuum gas oil, reduced crude, or another source of relatively high boiling hydrocarbons with a catalyst such as composed of finely divided or particulate solid material. The catalyst is transported in a fluid-like manner by transmitting a gas or vapor through the catalyst at sufficient velocity to produce a desired regime of fluid transport. Contact of the oil with the fluidized material catalyzes the cracking reaction.

The cracking reaction typically deposits coke on the catalyst. Catalyst exiting the reaction zone is commonly referred to as being "spent", i.e., partially deactivated by the deposition of coke upon the catalyst. Coke is comprised of hydrogen and carbon and can include, in trace quantities, other materials such as sulfur and metals such that may enter the process with the starting material. The presence of coke interferes with the catalytic activity of the spent catalyst. It is believed that the coke blocks acid sites on the catalyst surface where the cracking reactions take place. Spent catalyst is traditionally transferred to a stripper that removes adsorbed hydrocarbons and gases from catalyst and then to a regenerator for the purpose of removing the coke by oxidation with an oxygen-containing gas. An inventory of catalyst having a reduced coke content, relative to the spent catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated between the reaction zone and the regeneration zone. The fluidized catalyst, as well as providing a catalytic function, serves as a vehicle for the transfer of heat from zone to zone. FCC processing is more fully described in U.S. Pat. No. 5,360,533 to Tagamolila et al., U.S. Pat. No. 5,584,985 to Lomas, U.S. Pat. No. 5,858,206 to Castillo and U.S. Pat. No. 6,843,906 B1 to Eng. Specific details of the various contact zones, regeneration zones, and stripping zones along with arrangements for conveying the catalyst between the various zones are well known to those skilled in the art.

The FCC reactor serves to crack gas oil or heavier feeds into a broad range of products. Cracked vapors from an FCC unit enter a separation zone, typically in the form of a main column, that provides a gas stream, a gasoline cut, light cycle oil (LCO) and clarified oil (CO) which includes heavy cycle oil (HCO) components. The gas stream may include dry gas, i.e., hydrogen and $C_1$ and $C_2$ hydrocarbons, and liquefied petroleum gas ("LPG"), i.e., $C_3$ and $C_4$ hydrocarbons, also sometimes commonly referred to as wet gas.

In view of an increasing need and demand for light olefins such as ethylene and propylene for various petrochemical uses such as for the production of polyethylene, polypropylene and the like as well as the desire to produce relatively less of heavier olefins such as butylenes and pentenes which are generally less desirable as gasoline blending components due to environmental considerations, it may be desired to practice the cracking reaction processing of heavy hydrocarbon feedstock to increase the relative amount of light olefins in the resulting product slate.

Research efforts have led to the development of an FCC process that produces or results in greater relative yields of light olefins, i.e., ethylene and propylene. Such processing is more fully described in U.S. Pat. No. 6,538,169 B1 to Pittman et al. As disclosed therein, a hydrocarbon feed stream can desirably be contacted with a blended catalyst comprising regenerated catalyst and coked catalyst. The catalyst has a composition including a first component and a second component. The second component comprises a zeolite with no greater than medium pore size wherein the zeolite comprises at least 1 wt. % of the catalyst composition. The contacting occurs in a riser to crack hydrocarbons in the feed stream and obtain a cracked stream containing hydrocarbon products including light olefins and coked catalyst. The cracked stream is passed out of an end of the riser such that the hydrocarbon feed stream is in contact with the blended catalyst in the riser for less than or equal to 2 seconds on average.

Gas recovery units associated with conventional FCC processes are commonly referred to as gas concentration units or gas plants, conventional gas recovery units associated with FCC process typically neither seek nor are directed to recovery of ethylene from a process stream. In such units, ethylene is typically not recovered but rather purged to fuel gas. Additionally conventional gas recovery units are not designed to handle the additional volumes of ethylene and propylene generated in these FCC processes wherein light olefins are produced in significantly increased relative yields.

In the past, ethylene recovery from fuel gas streams has been accomplished in separate ethylene recovery units. However such ethylene recovery units generally have a high capital cost and duplicate equipment and steps within the conventional gas recovery units.

In view of the increasing need and demand for light olefins such as ethylene and propylene, there is a need and a demand for improved processing and arrangements for the separation and recovery of such light olefins from such FCC processing effluent.

SUMMARY OF THE INVENTION

A general object of the invention is to provide an improved process and system for catalytically cracking a heavy hydrocarbon feedstock and obtaining selected hydrocarbons including light olefins.

The general object of the invention can be attained, at least in part, through a process for catalytic cracking a heavy hydrocarbon feedstock and recovering select hydrocarbons including light olefins. In accordance with one preferred embodiment, the process includes contacting a heavy hydrocarbon feedstock with a hydrocarbon cracking catalyst in a fluidized reactor zone at effective conditions to produce light olefins to form a fluid catalytic cracker effluent stream containing a range of hydrocarbons. In a separation system, the fluid catalytic cracker effluent stream is separated to form a first separation system stream comprising primarily $C_4$– hydrocarbons and at least a second separation system stream comprising primarily $C_5+$ hydrocarbons.

At least a portion of the first separation system stream is contacted in an absorption system with an absorption solvent at effective conditions to absorb a significant portion of $C_2+$ hydrocarbons to form a first absorption system stream comprising primarily methane and hydrogen and to form a second absorption system stream comprising at least a portion of the absorption solvent and $C_2+$ hydrocarbons.

The process further includes separating at least a portion of the second absorption system stream to form at least a first process stream comprising at least a portion of the absorption solvent and at least one second process stream comprising a remaining portion of the second absorption system stream. At least a portion of the first process stream is returned to the absorption system as the absorption solvent.

The prior art generally fails to provide processing schemes and arrangements for obtaining light olefins via the catalytic cracking of a heavy hydrocarbon feedstock in an as effective and efficient a manner as may be desired. More particularly, the prior art generally fails to provide such processing schemes and arrangements that advantageously utilize absorption and separation processing of hydrocarbon effluent products to produce or otherwise form process streams containing specifically desired ranges of hydrocarbons including light olefins.

Another embodiment includes a process for catalytic cracking a heavy hydrocarbon feedstock and recovering select hydrocarbons including light olefins. Such a process includes contacting a heavy hydrocarbon feedstock with a hydrocarbon cracking catalyst in a fluidized reactor zone at effective conditions to produce light olefins to form a fluid catalytic cracker effluent stream comprising a range of hydrocarbons and the hydrocarbon cracking catalyst having a catalyst composition including a first component including a large pore molecular sieve and a second component including a zeolite with no greater than medium pore size, the zeolite with no greater than medium pore size comprising at least 1.0 wt. % of the catalyst composition.

The fluid catalytic cracker effluent stream is separated in a separation system to form a first separation system stream comprising primarily $C_4-$ hydrocarbons and at least a second separation system stream comprising primarily $C_5+$ hydrocarbons. At least a portion of the first separation system stream is contacted in an absorption system with an absorption solvent at effective conditions to absorb a significant portion of $C_2+$ hydrocarbons to form a first absorption system stream comprising primarily methane and hydrogen, and to form a second absorption system stream comprising at least a portion of the absorption solvent and $C_2+$ hydrocarbons.

The process further includes separating at least a portion of the second absorption system stream to form a first process stream comprising at least a portion of the absorption solvent, a first separated process stream comprising primarily $C_2$ hydrocarbons, a second separated process stream comprising primarily $C_3$ hydrocarbons, and a residual separated process stream comprising a remaining portion of the second absorption system stream. At least a portion of the first process stream is returned to the absorption system as the absorption solvent. The first separated process stream is separated in a $C_2$ separation unit to form a first $C_2$ separation unit stream comprising primarily ethylene and a second $C_2$ separation unit stream comprising primarily ethane. The second separated process stream is separated in a $C_3$ separation unit to form a first $C_3$ separation unit stream comprising primarily propylene and a second $C_3$ separation unit stream comprising primarily propane.

A system for catalytically cracking a heavy hydrocarbon feedstock and obtaining selected hydrocarbons is also provided. In accordance with a preferred embodiment, such a system includes a fluidized reactor zone wherein a heavy hydrocarbon feedstock contacts a hydrocarbon cracking catalyst at cracking conditions to produce a fluid catalytic cracker effluent stream including light olefins. A separation system separates the fluid catalytic cracker effluent stream into a first separation system stream comprising primarily $C_4-$ hydrocarbons and at least a second separation system stream comprising primarily $C_5+$ hydrocarbons.

The system for catalytically cracking a heavy hydrocarbon feedstock and obtaining selected hydrocarbons also includes an absorption system with an absorption solvent at effective conditions to absorb a significant portion of $C_2+$ hydrocarbons that forms a first absorption system stream comprising primarily methane and hydrogen and a second absorption system stream comprising at least a portion of the absorption solvent and $C_2+$ hydrocarbons. A separation process system separates at least a portion of the second absorption system stream to form at least a first process stream comprising at least a portion of the absorption solvent and at least one second process stream comprising a remaining portion of the second absorption system stream. A return line that returns at least a portion of the first process stream to the absorption system as absorption solvent is included.

As used herein, references to "light olefins" are to be understood to generally refer to $C_2$ and $C_3$ olefins, i.e., ethylene and propylene, alone or in combination.

References to "$C_x$ hydrocarbon" are to be understood to refer to hydrocarbon molecules having the number of carbon atoms represented by the subscript "x". Similarly, the term "$C_x$-containing stream" refers to a stream that contains $C_x$ hydrocarbon. The term "$C_x+$ hydrocarbons" refers to hydrocarbon molecules having the number of carbon atoms represented by the subscript "x" or greater. For example, "$C_4+$ hydrocarbons" include $C_4$, $C_5$ and higher carbon number hydrocarbons. The term "$C_x-$ hydrocarbons" refers to hydrocarbon molecules having the number of carbon atoms represented by the subscript "x" or fewer. For example, "$C_4-$ hydrocarbons" include $C_4$, $C_3$ and lower carbon number hydrocarbons.

As used herein, references to "significant" with respect to a portion of $C_2+$ hydrocarbons are to be understood to generally refer to at least 75%, preferably at least 90%, and more preferably 93% to 95% of the identified element or elements.

As used herein, references to "primarily" with respect to hydrogen, methane, $C_4-$ hydrocarbons, $C_5+$ hydrocarbons, $C_2+$ hydrocarbons, $C_2$ hydrocarbons, $C_3$ hydrocarbons, ethylene, ethane, propylene, propane, gasoline, $C_4$ hydrocarbons, alone or in combination are to be understood to generally refer to at least 75%, preferably at least 90%, and more preferably 93% to 95% of the identified element or elements.

As used herein, references to "$C_4$ hydrocarbons" are to be understood to generally refer to four carbon molecules and any isomers including normal butane, isobutane, 1-butene, 2-butene, isobutene, and butadiene.

Other objects and advantages will be apparent to those skilled in the art from the following detailed description taken in conjunction with the appended claims and drawings.

Those skilled in the art and guided by the teachings herein provided will recognize and appreciate that the illustrated systems or process flow diagrams have been simplified by the elimination of various usual or customary pieces of process equipment including some heat exchangers, process control systems, pumps, fractionation systems, and the like. It may also be discerned that the process flow depicted in the figures may be modified in many aspects without departing from the basic overall concept of the invention.

DETAILED DESCRIPTION

Processing schemes and arrangements are provided for effectively and efficiently processing a heavy hydrocarbon feedstock via fluid catalytic cracking with selected hydrocarbons including light olefins being obtained via absorption and separation recovery.

Figure 1:
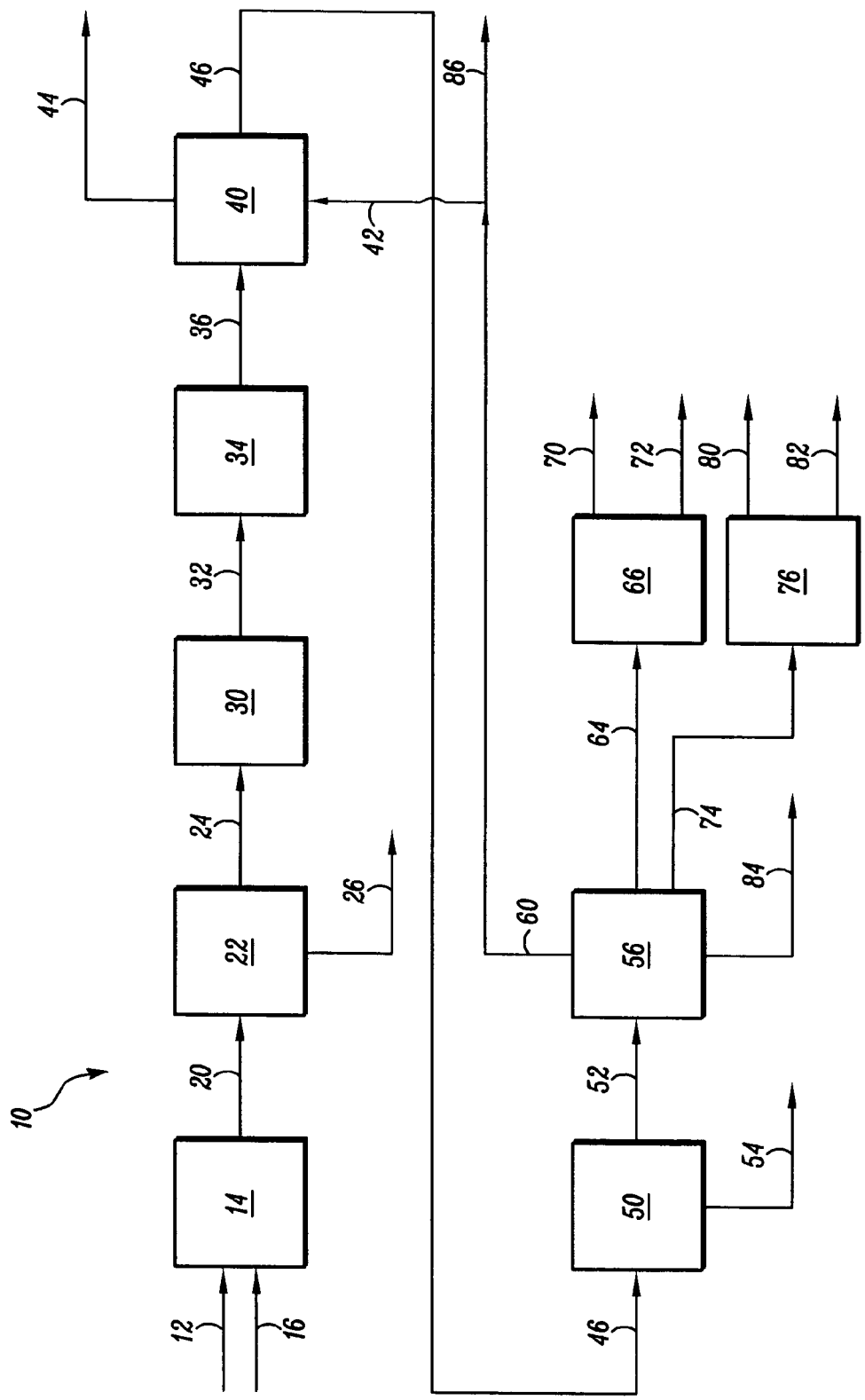
FIG. 1 is a simplified schematic diagram of a system for catalytic cracking a heavy hydrocarbon feedstock and obtaining selected hydrocarbon fractions including light olefins, in accordance with one preferred embodiment.

FIG. 1 schematically illustrates a system, generally designated by the reference numeral 10, for fluid catalytic cracking a heavy hydrocarbon feedstock and obtaining light olefins via absorption and separation, in accordance with one embodiment.

In the system 10, a suitable heavy hydrocarbon feedstock 12 is introduced into a fluidized reactor zone 14 wherein the heavy hydrocarbon feedstock 12 contacts with a hydrocarbon cracking catalyst 16 to produce a fluid catalytic cracker effluent stream 20 comprising a range of hydrocarbon products, including light olefins.

Suitable fluidized catalytic cracking reactor zones for use in the practice of such an embodiment may, as is described in above-identified U.S. Pat. No. 6,538,169 B1 to Pittman et al., include a separator vessel, a regenerator, a blending vessel, and a vertical riser that provides a pneumatic conveyance zone in which conversion takes place. The arrangement circulates catalyst and contacts feed in a specifically described manner.

More specifically and as described therein, the catalyst typically comprises two components that may or may not be on the same matrix. The two components are circulated throughout the entire system. The first component may include any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst component comprises a large pore zeolite, such as a Y-type zeolite, an active alumina material, a binder material, comprising either silica or alumina and an inert filler such as kaolin.

The zeolitic molecular sieves appropriate for the first catalyst component should have a large average pore size. Typically, molecular sieves with a large pore size have pores with openings of greater than 0.7 nm in effective diameter defined by greater than 10 and typically 12 membered rings. Pore Size Indices of large pores are above about 31. Suitable large pore zeolite components include synthetic zeolites such as X-type and Y-type zeolites, mordenite and faujasite. It has been found that Y zeolites with low rare earth content are preferred in the first catalyst component. Low rare earth content denotes less than or equal to about 1.0 wt. % rare earth oxide on the zeolite portion of the catalyst. Octacat™ catalyst made by W. R. Grace & Co. is a suitable low rare earth Y-zeolite catalyst.

The second catalyst component comprises a catalyst containing, medium or smaller pore zeolite catalyst exemplified by ZSM-5, ZSM-11, ZSM-12, ZSM-23, ZSM-35, ZSM-38, ZSM-48, and other similar materials. U.S. Pat. No. 3,702,886 describes ZSM-5. Other suitable medium or smaller pore zeolites include ferrierite, erionite, and ST-5, developed by Petroleos de Venezuela, S.A. The second catalyst component preferably disperses the medium or smaller pore zeolite on a matrix comprising a binder material such as silica or alumina and an inert filer material such as kaolin. The second component may also comprise some other active material such as Beta zeolite. These catalyst compositions have a crystalline zeolite content of 10 wt. % to 25 wt. % or more and a matrix material content of 75 wt. % to 90 wt. %. Catalysts containing 25 wt. % crystalline zeolite material are preferred. Catalysts with greater crystalline zeolite content may be used, provided they have satisfactory attrition resistance. Medium and smaller pore zeolites are characterized by having an effective pore opening diameter of less than or equal to 0.7 nm, rings of 10 or fewer members and a Pore Size Index of less than 31.

The total catalyst composition should contain 1 wt. % to 10 wt. % of a medium to small pore zeolite with greater than or equal to 1.75 wt. % being preferred. When the second catalyst component contains 25 wt. % crystalline zeolite, the composition contains 4 wt. % to 40 wt. % of the second catalyst component with a preferred content of greater than or equal to 7 wt. %. ZSM-5 and ST-5 type zeolites are particularly preferred since their high coke resistivity will tend to preserve active cracking sites as the catalyst composition makes multiple passes through the riser, thereby maintaining overall activity. The first catalyst component will comprise the balance of the catalyst composition. The relative proportions of the first and second components in the catalyst composition will not substantially vary throughout the FCC unit.

The high concentration of the medium or smaller pore zeolite in the second component of the catalyst composition improves selectivity to light olefins by further cracking the lighter naphtha range molecules. But at the same time, the resulting smaller concentration of the first catalyst component still exhibits sufficient activity to maintain conversion of the heavier feed molecules to a reasonably high level.

The relatively heavier feeds suitable for processing in accordance herewith include conventional FCC feedstocks or higher boiling or residual feeds. A common conventional feedstock is vacuum gas oil which is typically a hydrocarbon material prepared by vacuum fractionation of atmospheric residue and which has a broad boiling range of from 315° C. to 622° C. (600° F. to 1150° F.) and, more typically, which has a narrower boiling point range of from 343° C. to 551° C. (650° F. to 1025° F.). Heavy or residual feeds, i.e., hydrocarbon fractions boiling above 499° C. (930° F.), are also suitable. The fluidized catalytic cracking processing the invention is typically best suited for feedstocks that are heavier than naptha range hydrocarbons boiling above about 177° C. (350° F.).

The fluid catalytic cracker effluent stream 20 from the fluidized reactor zone 14 passes into a separation system 22, such as may include a main column section and a staged compression section and associated pumps, pipes, heat exchangers, flash drums, and the like, as will be appreciated by those skilled in the art and guided by the teachings herein provided. To facilitate illustration and discussion, other fraction lines such as including a heavy gasoline stream, a light cycle oil ("LCO") stream, a heavy cycle oil ("HCO") stream and a clarified oil ("CO") stream, for example, may not here be shown nor hereinafter specifically described.

The separation system 22 desirably splits the fluid catalytic cracker effluent stream 20 into at least a first separation system stream 24 comprising $C_4-$ hydrocarbons and at least a second separation system stream 26 comprising $C_5+$ hydrocarbons.

Optionally, at least a portion of the first separation system stream 24 is cooled in a coolant system 30 to result in a coolant system stream 32, according to one embodiment. The temperature of the coolant system stream 32 is desirably in a range of about 4° C. to about 27° C. (about 40° F. to about 80° F.) with such coolant system stream preferably having a temperature range of about 13° C. to about 18° C. (about 55° F. to about 65° F.) in accordance with one preferred embodiment. Cooling is typically accomplished with heat exchangers as known in the art and heat is typically rejected to air, cooling water, chilled water, brine, other process stream, refrigerant, or the like. As will be appreciated by those skilled in the art and guided by the teachings herein provided, such cooling or chilling of a stream can reduce the power requirements for compression of the stream but too low a temperature can result in foaming because of the presence of water or freezing/solidification and fouling of the equipment.

At least a portion of the coolant system stream 32 may be compressed in a compression system 34 resulting in a compression system stream 36 according to one embodiment. The pressure of the compression system stream 36 is desirably at least about 1,379 kPag (about 200 psig) and a preferred pressure range of about 2,070 kPag to about 2,760 kPag (about 300 psig to about 400 psig) and more preferably a range of about 2,585 kPag to about 2,760 kPag (about 375 psig to about 400 psig). Compression in one or more stages by compressor types including centrifugal, reciprocating, screw, and the like is known in the art. As also is known in the art, the use of suction chilling, interstage cooling, and/or after cooling and other associated process equipment can be included in the compression system 36. Compressor discharge temperatures below about 149° C. (about 300° F.) may minimize fouling of downstream equipment by diolefin polymerization.

In an embodiment, at least a portion of the compression system stream 36 enters the absorption system 40 for contact with an absorption solvent stream 42. The absorption solvent can be adapted to absorb a significant portion of $C_2+$ hydrocarbons including light olefins from the compression system stream 36. Suitable absorption solvents include, but are not limited to, light cycle oil, gasoline, aromatics, naphthenes, paraffins, and olefins. According a preferred embodiment, the absorption solvent comprises $C_4$ hydrocarbons, sometimes referred to herein as "mixed $C_4$s". The absorption system 40 desirably operates at effective conditions to absorb a significant portion of $C_2+$ hydrocarbons and may include a pressure of at least about 1,379 kPag (about 200 psig) and a preferred pressure range of about 2,070 kPag to about 2,760 kPag (about 300 psig to about 400 psig) and more preferably a range of about 2,585 kPag to about 2,760 kPag (about 375 psig to about 400 psig). The effective conditions desirably also include a temperature range of about 4° C. to about 27° C. (about 40° F. to about 80° F.) and a preferred temperature range of about 13° C. to about 18° C. (about 55° F. to about 65° F.).

Contact of the compression system stream 36 with the absorption solvent stream 42 forms a first absorption system stream 44 such as desirably comprising primarily hydrogen and methane. According to one embodiment, the first absorption system stream comprises methane and hydrogen wherein the total concentration of methane and hydrogen is about 80 mol. % to about 90 mol. %. Other contaminates such as including, but not limited to, acetylene, carbon monoxide, carbon dioxide, and hydrogen sulfide may be present in the first absorption system stream 44. The first absorption system stream 44 may be treated to remove impurities and then typically is purged to fuel gas or flared. Contact of the compression system stream 36 with the absorption solvent stream 42 also forms a second absorption system stream 46 comprising at least a portion of the absorption solvent and $C_2+$ hydrocarbons, including light olefins. The process of contacting streams with the use of nozzles, plates, trays, packing, and associated process equipment is known in the art.

The absorption system may include any combination of absorber and stripper columns. In a one embodiment, the absorption system includes a primary absorber, a sponge or secondary absorber, and a stripper. The primary absorber may have about ten theoretical stages and the secondary absorber system may have about six theoretical stages. The stripper may have about ten theoretical stages. The absorption system may desirably recover at least about 90 mol. % and preferably at least about 99 mol. % and more preferably about 99.9 mol. % of the methane and hydrogen processed in the system.

The second absorption system stream 46 may additionally include impurities such as, but not limited to, hydrogen sulfide, mercaptan, sulfur, water, carbon monoxide, carbon dioxide, acetylene, carbonyl sulfide, nitrogen oxides, di-olefins, phosphine, and arsenic.

According to one embodiment, a treatment system 50 treats at least a portion of the second absorption system stream 46 to form at least one treatment system stream 52 and at least one impurity stream 54. The treatment system 50 desirably may be designed for liquid phase treating. The treatment system 50 may alternatively be sized for larger volumes required for vapor phase treating. The treatment system 50 may include adapting one or more of amine treating, caustic treating, hydrotreating, drying, shift conversion, metathesis, alkylation, and the like. Such treatment system is desirably capable of removing hydrogen sulfide, mercaptan, sulfur, water, carbon monoxide, carbon dioxide, acetylene, carbonyl sulfide, nitrogen oxides, di-olefins, phosphine, arsenic and/or other targeted impurities.

The treatment system stream 52 enters a separation process system 56. The separation process system 56 forms at least a first process stream 60 comprising primarily absorption solvent and at least a second process stream comprising a remaining portion of the treatment system stream 52. The separation process system 56 can be accomplished via distillation and fraction techniques in columns or vessels via trays, plates, and/or packing to produce the desired hydrocarbon splits or fractions.

The separation process system 56 may further separate the treatment system stream 52 to form a first separated process stream 64 comprising primarily $C_2$ hydrocarbons. The first separated process stream 64 can then be processed in a $C_2$ separation unit 66 to form a first $C_2$ separation unit stream 70 comprising primarily ethylene and a second $C_2$ separation unit stream 72 comprising primarily ethane. The first $C_2$ separation unit stream typically comprises at least about 90 vol. % ethylene, preferably at least about 99.0 vol. % ethylene, and more preferably at least about 99.9 vol. % ethylene. Product with a purity of 99.9 vol. % ethylene may qualify for polymer grade commercial sales specifications. The $C_2$ separation unit 66 is also sometimes referred to as a $C_2$ splitter or ethane/ethylene splitter and may produce streams for commercial sales or for further processes as is known in the art. In accordance with a preferred embodiment, the ethylene recovery from the system 10 is at least about 90 mol. % of the ethylene produced in the FCC unit and more preferably at least about 93 mol. % to about 98 mol. %.

The separation process system 56 may further separate the treatment system stream 52 into a second separated process stream 74 comprising primarily $C_3$ hydrocarbons. The second separated process stream 74 can then be processed in a $C_3$ separation unit 76 to form a first $C_3$ separation unit stream 80 comprising primarily propylene and a second $C_3$ separation unit stream 82 comprising primarily propane. The first $C_3$ separation unit stream typically comprises at least about 90 vol. % propylene, preferably at least about 99.0 vol. % propylene, and more preferably at least about 99.5 vol. % propylene. Product with a purity of 99.5 vol. % propylene may qualify for polymer grade commercial sales specifications. The $C_3$ separation unit 76 is also sometimes referred to as a $C_3$ splitter or propane/propylene splitter and produces streams for commercial sales or for further processes as is know in the art. In accordance with a preferred embodiment, the propylene recovery from the system 10 is at least about 90 mol. % of the propylene produced in the FCC unit and more preferably at least about 97 mol. %.

According to one embodiment, the remaining portion or balance of the second separation stream after the split of the first process stream, first separated process stream, and second separated process stream is referred to herein as a residual separated process stream.

The separation process system 56 may further separate the treatment system stream 52 into a third separated process stream 84 comprising primarily gasoline. Gasoline, in this case, comprises primarily $C_5+$ hydrocarbons. Other splits such as $C_4$s from the separation process system 56 are possible as is known in the art. A $C_4$ stream may further be processed in a debutanizer unit which has about twenty-two theoretical stages. A $C_4$ stream may be suitable for commercial sales or for further processes as is know in the art. In accordance with one preferred embodiment, the separation process system 56 may include a splitter column with about sixteen theoretical stages and recover 99 vol. % of the propylene feed.

In one embodiment, at least a part of the separation process system 56 includes at least one dividing wall column. Such a dividing wall column typically operates in a more energy efficient manner than a simple sidedraw column and also desirably produces a sharper product split than normally obtainable with conventional sidedraw columns. The dividing wall column includes a dividing wall positioned within and desirably includes a plurality of stages and generally comprises a central or middle dividing wall section, as well as an upper or top section and a lower or bottom section. The upper section may be of reduced internal diameter as compared to the central dividing wall section and the lower section may be of increased diameter as compared as compared to the central dividing wall section.

At least a portion of the first process stream 60 may be returned to the absorption system 40 as the absorption solvent. A remaining portion of the first process stream 60 may form a $C_4$ stream 86, if a $C_4$s stream is used as the solvent, for commercial sales or for further processes as is know in the art.

Figure 2:
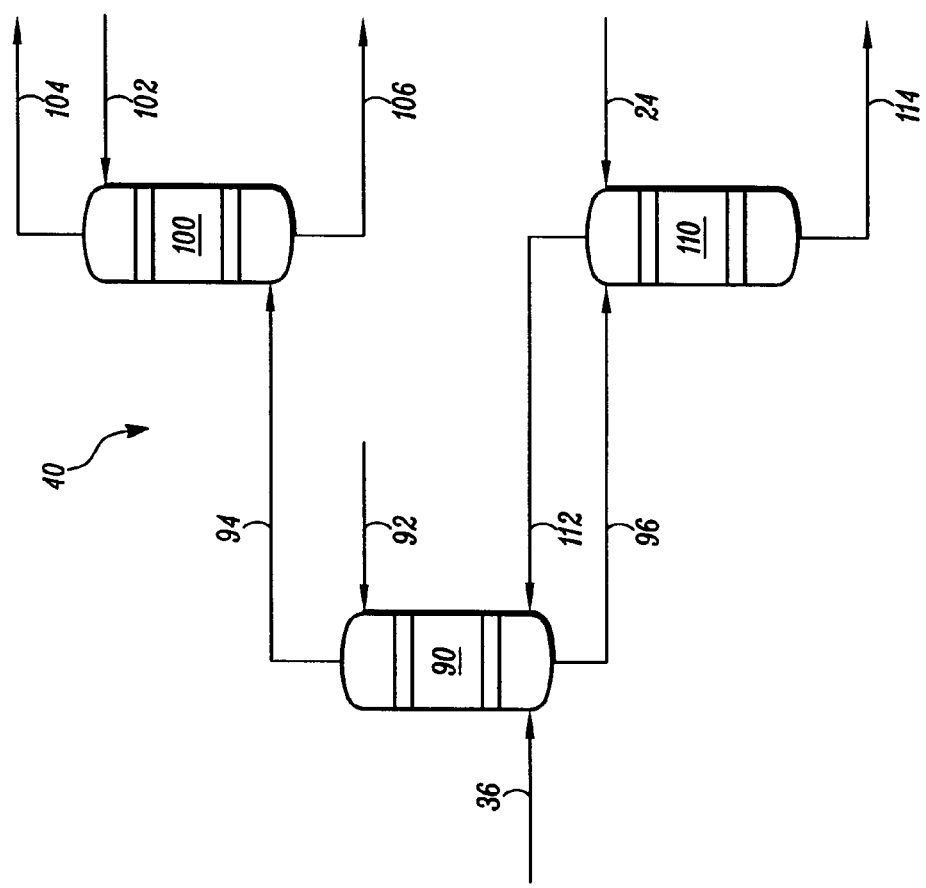
FIG. 2 is a simplified schematic diagram showing additional details of the absorption system in accordance with one preferred embodiment.

According to a preferred embodiment and as shown in FIG. 2, the absorption system 40 includes a primary absorption unit 90 for contacting at least a portion of the compression system stream 36 with a primary absorption solvent stream 92. Contact in the primary absorption unit 90 results in a first primary absorption unit stream 94 comprising primarily hydrogen, methane and a quantity of light olefins and a second primary absorption unit stream 96 comprising at least a portion of the primary absorption solvent and $C_{2+}$ hydrocarbons. Suitable primary absorption solvents and the effective conditions to absorb a significant portion of $C_2+$ hydrocarbons in the primary absorption unit 90 were generally discussed above.

The absorption system 40 further includes a secondary absorption unit 100 for contacting at least a portion of the first primary absorption unit stream 94 with a secondary absorption unit solvent stream 102 to form a first secondary absorption unit stream 104 comprising primarily hydrogen and methane and a second secondary absorption unit stream 106 comprising a quantity of secondary absorption solvent and light olefins. Typically, but not necessarily, the second secondary absorption unit stream 106 may be processed in the main separation system 22 or other suitable location. Suitable secondary absorption solvents and effective conditions to absorb a significant portion of light olefins in the secondary absorption unit 100 are generally discussed above. The secondary absorption solvent 102 may comprise a liquid portion of the first separation system stream 24.

As also shown in FIG. 2, the absorption system 40 further includes a stripper unit 110. The stripper unit may be adaptable to receive at least a portion of the first separation system stream 24 such as, for example, that may allow recovery of a range of hydrocarbons including light olefins from this stream. Alternatively, the stripper unit 110 also may receive a liquid portion of the separation system stream 24 to recover light olefins.

Additionally, the stripper unit 110 can strip additional hydrogen and methane from the second primary absorption unit stream 96 to form a first stripper unit stream 112 comprising primarily hydrogen and methane and a second stripper unit stream 114 comprising primarily $C_2+$ hydrocarbons such as may form the second absorption system stream 46 as shown in FIG. 1.

Those skilled in the art skilled in the art and guided by the teachings herein provided will recognize and appreciate that there are several possible ways to connect liquid streams and vapor streams between the primary absorption unit 90 and the stripper unit 110 to produce the desired results. The connections can include piping, pumps, compressors, heat exchangers, flash drums or vessels, and the like. The primary absorber unit and the stripper unit can be integral. The stripper unit may be connected to the primary absorption unit 90 via a flash drum such may desirably also serve as a liquid vapor separator following a final compression stage of the compression system stream 36 such that a vapor phase stream may be supplied to the primary absorption unit and a liquid phase stream may be supplied to the stripper unit, not illustrated.

Thus processing schemes and arrangements are desirably provided for obtaining light olefins via the catalytic cracking of a heavy hydrocarbon feedstock. More particularly, processing schemes and arrangements are provided that advantageously utilize absorption and separation of hydrocarbon catalytic cracker effluent to produce or otherwise form process streams containing specifically desired ranges of hydrocarbons including light olefins. The processing schemes desirably are capable of processing the additional volumes of light olefins created by fluid catalytic cracking units operating in high severity modes and configurations. An additional benefit is recovery of valuable ethylene for use in other refinery or petrochemical process rather than being purged to a fuel gas grid or flare system.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A process for catalytic cracking a heavy hydrocarbon feedstock and recovering select hydrocarbons including light olefins, the process comprising:
    contacting a heavy hydrocarbon feedstock with a hydrocarbon cracking catalyst in a fluidized reactor zone at effective conditions to produce light olefins to form a fluid catalytic cracker effluent stream comprising a range of hydrocarbons;
    separating the fluid catalytic cracker effluent stream in a separation system to form a first separation system stream comprising primarily $C_4-$ hydrocarbons and at least a second separation system stream comprising primarily $C_5+$ hydrocarbons;
    cooling at least a portion of the first separation system stream;
    then compressing at least a portion of the first separation system stream;
    then contacting at least a portion of the first separation system stream in an absorption system with an absorption solvent at effective conditions to absorb a significant portion of $C_2+$ hydrocarbons from the first separation process stream to form a first absorption system stream comprising primarily methane and hydrogen and to form a second absorption system stream comprising a portion of the absorption solvent and $C_2+$ hydrocarbons, wherein the effective conditions to absorb a significant portion of $C_2+$ hydrocarbons in the absorption system comprise a temperature of about 4° C. to about 27° C. (about 40° F. to about 80° F.);
    separating at least a portion of the second absorption system stream to form at least a first process stream comprising at least a portion of the absorption solvent and at least one second process stream comprising a remaining portion of the second absorption system stream; and
    returning at least a portion of the first process stream to the absorption system as the absorption solvent.

2. The process of claim 1 wherein the contacting of the heavy hydrocarbon feedstock with a hydrocarbon cracking catalyst comprises contacting the heavy hydrocarbon feedstock with a blended catalyst comprising regenerated catalyst and coked catalyst in a fluidized reactor zone at hydrocarbon cracking reaction conditions to produce a fluid catalytic cracker effluent stream containing hydrocarbon products including light olefins, the catalyst having a catalyst composition including a first component comprising a large pore molecular sieve and a second component comprising a zeolite with no greater than medium pore size, the zeolite with no greater than medium pore size comprising at least 1.0 wt. % of the catalyst composition.

3. The process of claim 1 wherein the step of separating at least a portion of the second absorption system stream comprises forming a first separated process stream comprising primarily $C_2$ hydrocarbons and the process further comprises separating at least a portion of the first separated process stream in a $C_2$ separation unit to form a first $C_2$ separation unit stream comprising primarily ethylene and a second $C_2$ separation unit stream comprising primarily ethane.

4. The process of claim 1 wherein the step of separating at least a portion of the second absorption system stream comprises forming a second separated process stream comprising primarily $C_3$ hydrocarbons and the process further comprises separating at least a portion of the second separated process stream in a $C_3$ separation unit to form a first $C_3$ separation unit stream comprising primarily propylene and a second $C_3$ separation unit stream comprising primarily propane.

5. The process of claim 1 wherein the step of separating at least a portion of the second absorption system stream comprises forming a third separated process stream comprising primarily gasoline.

6. The process of claim 1 wherein the absorption solvent comprises primarily $C_4$ hydrocarbons.

7. The process of claim 1 wherein the effective conditions to absorb a significant portion of $C_2+$ hydrocarbons in the absorption system comprise a pressure of at least about 1,379 kPag (about 200 psig).

8. The process of claim 1 wherein the step of contacting at least a portion of the first separation system stream in an absorption system comprises:
    contacting at least a portion of the first separation system stream in a primary absorption unit with a primary absorption solvent at effective conditions to absorb a significant portion of $C_2+$ hydrocarbons to form a first primary absorption unit stream comprising primarily methane and hydrogen and to form a second primary absorption unit stream comprising at least a portion of the primary absorption solvent, $C_2+$ hydrocarbons, a quantity of light olefins and a reduced quantity of hydrogen and methane;
    contacting at least a portion of the first primary absorption unit stream in a secondary absorption unit with a secondary absorption solvent comprising a liquid portion of the first separation system stream at effective conditions to absorb light olefins to form a first secondary absorption unit stream comprising primarily methane and hydrogen and a second secondary absorption unit stream comprising a quantity of $C_2+$ hydrocarbons including light olefins;
    stripping at least a quantity of methane and hydrogen from at least a portion of the second primary absorption unit stream in a stripper unit at effective conditions to form a first stripper unit stream comprising a quantity of hydrogen and methane and a second stripper unit stream comprising at least a portion of the primary absorption solvent and $C_2+$ hydrocarbons including light olefins; and
    returning at least a portion of the first stripper unit stream to the primary absorption unit.

9. The process of claim 8 further comprising stripping a liquid portion of the first separation system stream in the stripping unit.

10. The process of claim 1 wherein the second absorption system stream includes a quantity of at least one impurity selected from the group consisting of hydrogen sulfide, mercaptan, sulfur, water, carbon dioxide, and acetylene, the process further comprising treating at least a portion of the second absorption system stream in a treatment system to remove at least a portion of the impurity.

11. A process for catalytic cracking a heavy hydrocarbon feedstock and recovering select hydrocarbons including light olefins, the process comprising:
    contacting a heavy hydrocarbon feedstock with a hydrocarbon cracking catalyst in a fluidized reactor zone at effective conditions to produce light olefins to form a fluid catalytic cracker effluent stream comprising a range of hydrocarbons wherein the hydrocarbon cracking catalyst comprises contacting the heavy hydrocarbon feedstock with a catalyst in a fluidized reactor zone at hydrocarbon cracking reaction conditions to produce a cracked stream containing hydrocarbon products including light olefins, the catalyst having a catalyst composition including a first component comprising a large pore molecular sieve and a second component comprising a zeolite with no greater than medium pore size, the zeolite with no greater than medium pore size comprising at least 1.0 wt. % of the catalyst composition;

separating the fluid catalytic cracker effluent stream in a separation system to form a first separation system stream comprising primarily $C_4-$ hydrocarbons and at least a second separation system stream comprising primarily $C_5+$ hydrocarbons;

contacting at least a portion of the first separation system stream in an absorption system with an absorption solvent at effective conditions to absorb a significant portion of $C_2+$ hydrocarbons from the first separation system stream to form a first absorption system stream comprising primarily methane and hydrogen, and to form a second absorption system stream comprising at least a portion of the absorption solvent, $C_2+$ hydrocarbons and a quantity of at least one impurity selected from the group consisting of hydrogen sulfide, mercaptan, sulfur, water, carbon dioxide, and acetylene;

treating at least a portion of the second absorption system stream in a treatment system to remove at least a portion of the impurity;

separating at least a portion of the treated second absorption system stream to form a first process stream comprising at least a portion of the absorption solvent, a first separated process stream comprising primarily $C_2$ hydrocarbons, a second separated process stream comprising primarily $C_3$ hydrocarbons, and a residual separated process stream comprising a remaining portion of the second absorption system stream;

returning at least a portion of the first process stream to the absorption system as the absorption solvent;

separating the first separated process stream in a $C_2$ separation unit to form a first $C_2$ separation unit stream comprising primarily ethylene and a second $C_2$ separation unit stream comprising primarily ethane; and separating the second separated process stream in a $C_3$ separation unit to form a first $C_3$ separation unit stream comprising primarily propylene and a second $C_3$ separation unit stream comprising primarily propane.

12. The process of claim 11 wherein the absorption solvent comprises primarily $C_4$ hydrocarbons.

13. The process of claim 11 wherein the effective conditions to absorb a significant portion of $C_2+$ hydrocarbons in the absorption system comprise a pressure of at least about 1,379 kPag (about 200 psig) and a temperature of about 4° C. to about 27° C. (about 40° F. to about 80° F.).

14. The process of claim 11 wherein the step of contacting at least a portion of the first separation system stream in an absorption system comprises:

contacting at least a portion of the first separation system stream in a primary absorption unit with a primary absorption solvent at effective conditions to absorb a significant portion of $C_2+$ hydrocarbons to form a first primary absorption unit stream comprising primarily methane, hydrogen, and a quantity of light olefins and to form a second primary absorption unit stream comprising at least a portion of the primary absorption solvent and $C_2+$ hydrocarbons and a reduced quantity of methane and hydrogen;

contacting at least a portion of the first primary absorption unit stream in a secondary absorption unit with a secondary absorption solvent comprising a liquid portion of the first separation system stream at effective conditions to absorb light olefins to form a first secondary absorption unit stream comprising primarily methane and hydrogen and a second secondary absorption unit stream comprising a quantity $C_2+$ hydrocarbons including light olefins;

stripping at least a quantity of methane and hydrogen from at least a portion of the second primary absorption unit stream in a stripping unit at effective conditions to form a first stripper unit stream comprising a quantity of hydrogen and methane and a second stripper unit stream comprising at least a portion of the primary absorption solvent and $C_2+$ hydrocarbons including light olefins; and returning at least a portion of the first stripper unit stream to the primary absorption unit.

15. The process of claim 11 wherein prior to the step of contacting at least a portion of first separation system stream in an absorption system, the process further comprises:

cooling at least a portion of the first separation system stream to a temperature of about 4° C. to about 27° C. (about 40° F. to about 80° F.); and compressing at least a portion of the first separation system stream to a pressure of at least about 1,379 kPag (about 200 psig).

16. The process of claim 11 wherein the catalyst comprises a blended catalyst comprising regenerated catalyst and coked catalyst.

17. A process for catalytic cracking a heavy hydrocarbon feedstock and recovering select hydrocarbons including light olefins, the process comprising:

contacting a heavy hydrocarbon feedstock with a hydrocarbon cracking catalyst in a fluidized reactor zone at effective conditions to produce light olefins to form a fluid catalytic cracker effluent stream comprising a range of hydrocarbons;

separating the fluid catalytic cracker effluent stream in a separation system to form a first separation system stream comprising primarily $C_4-$ hydrocarbons and at least a second separation system stream comprising primarily $C_5+$ hydrocarbons;

contacting at least a portion of the first separation system stream in a primary absorption unit with a primary absorption solvent at effective conditions to absorb a significant portion of $C_2+$ hydrocarbons to form a first primary absorption unit stream comprising primarily methane and hydrogen and to form a second primary absorption unit stream comprising at least a portion of the primary absorption solvent, $C_2+$ hydrocarbons, a quantity of light olefins and a reduced quantity of hydrogen and methane;

contacting at least a portion of the first primary absorption unit stream in a secondary absorption unit with a secondary absorption solvent comprising a liquid portion of the first separation system stream at effective conditions to absorb light olefins to form a first secondary absorption unit stream comprising primarily methane and hydrogen and a second secondary absorption unit stream comprising a quantity of $C_2+$ hydrocarbons including light olefins;

stripping at least a quantity of methane and hydrogen from at least a portion of the second primary absorption unit stream in a stripper unit at effective conditions to form a first stripper unit stream comprising a quantity of hydrogen and methane and a second stripper unit stream comprising at least a portion of the primary absorption solvent and $C_2+$ hydrocarbons including light olefins; and returning at least a portion of the first stripper unit stream to the primary absorption unit;

separating at least a portion of the second stripper unit stream to form at least a first process stream comprising at least a portion of the primary absorption solvent and at least one second process stream comprising a remaining portion of the second absorption system stream; and returning at least a portion of the first process stream to the absorption system as the primary absorption solvent.

18. The process of claim 17 wherein prior to the step of contacting at least a portion of the first separation system stream in an absorption system, the process further comprises:

cooling at least a portion of the first separation system stream to a temperature of about 4° C. to about 27° C. (about 40° F. to about 80° F.); and then compressing at least a portion of the first separation system stream to a pressure of at least about 1,379 kPag (about 200 psig).

19. The process of claim 17 wherein the second stripper unit stream includes a quantity of at least one impurity selected from the group consisting of hydrogen sulfide, mercaptan, sulfur, water, carbon dioxide, and acetylene, the process further comprising treating at least a portion of the second absorption system stream in a treatment system to remove at least a portion of the impurity.

20. The process of claim 17 wherein the step of separating at least a portion of the second stripper unit stream comprises forming a second separated process stream comprising primarily $C_3$ hydrocarbons and the process further comprises separating at least a portion of the second separated process stream in a $C_3$ separation unit to form a first $C_3$ separation unit stream comprising primarily propylene and a second $C_3$ separation unit stream comprising primarily propane.

* * * * *